United States Patent
Wolfram et al.

(10) Patent No.: US 10,068,016 B2
(45) Date of Patent: Sep. 4, 2018

(54) METHOD AND SYSTEM FOR PROVIDING ANSWERS TO QUERIES

(71) Applicant: WOLFRAM ALPHA LLC, Champaign, IL (US)

(72) Inventors: Stephen Wolfram, Concord, MA (US); Oyvind Tafjord, Eugene, OR (US)

(73) Assignee: Wolfram Alpha LLC, Champaign, IL (US)

( * ) Notice: Subject to any disclaimer, the term of this patent is extended or adjusted under 35 U.S.C. 154(b) by 297 days.

(21) Appl. No.: 14/517,562

(22) Filed: Oct. 17, 2014

(65) Prior Publication Data

US 2015/0112971 A1 Apr. 23, 2015

Related U.S. Application Data

(60) Provisional application No. 61/892,189, filed on Oct. 17, 2013.

(51) Int. Cl.
*G06F 17/30* (2006.01)

(52) U.S. Cl.
CPC .............. *G06F 17/30864* (2013.01)

(58) Field of Classification Search
None
See application file for complete search history.

(56) References Cited

U.S. PATENT DOCUMENTS

| | | | |
|---|---|---|---|
| 6,192,338 B1 | 2/2001 | Haszto et al. | |
| 6,233,547 B1* | 5/2001 | Denber | G06F 17/271 |
| | | | 704/9 |
| 6,604,075 B1 | 8/2003 | Brown et al. | |
| 7,953,731 B2* | 5/2011 | Patel | G06F 17/30867 |
| | | | 707/723 |
| 8,086,604 B2 | 12/2011 | Arrouye et al. | |
| 8,583,618 B2* | 11/2013 | Lemaire | G06F 17/30864 |
| | | | 707/706 |
| 8,601,015 B1 | 12/2013 | Wolfram et al. | |
| 8,788,524 B1* | 7/2014 | Wolfram | G06F 17/3064 |
| | | | 707/737 |
| 8,812,298 B1* | 8/2014 | Wolfram | G06F 17/2881 |
| | | | 704/251 |
| 8,856,096 B2* | 10/2014 | Marchisio | G06F 17/30731 |
| | | | 707/706 |
| 8,909,616 B2* | 12/2014 | Rosenoff | G06F 17/30864 |
| | | | 707/708 |
| 8,966,439 B2* | 2/2015 | Wolfram | G06F 8/30 |
| | | | 707/706 |
| 9,110,883 B2* | 8/2015 | Ghannam | G06F 17/2785 |
| 9,378,285 B2* | 6/2016 | Marchisio | G06F 17/30731 |
| 9,507,854 B2* | 11/2016 | Brown | G06F 17/30654 |
| 9,645,993 B2* | 5/2017 | Zuev | G06F 17/27 |
| 2002/0095411 A1 | 7/2002 | Caldwell et al. | |
| 2002/0150869 A1 | 10/2002 | Shpiro | |

(Continued)

OTHER PUBLICATIONS

U.S. Appl. No. 12/780,685, Wolfram et al., "Assumption Mechanism for Queries," filed May 14, 2010.

*Primary Examiner* — Debbie Le

(57) ABSTRACT

A natural language query is received, and an answer to the natural language query is determined. A message is formatted such that the message includes the answer, and metadata corresponding to the answer, the metadata including information to enable construction, using the metadata, of a sentence that rephrases the query and recites the answer.

30 Claims, 3 Drawing Sheets

(56) References Cited

U.S. PATENT DOCUMENTS

| | | |
|---|---|---|
| 2003/0220793 A1 | 11/2003 | Kosaka et al. |
| 2006/0276230 A1 | 12/2006 | McConnell |
| 2007/0038619 A1* | 2/2007 | Norton ................ G06F 17/3064 |
| 2008/0153465 A1 | 6/2008 | Evermann et al. |
| 2008/0154611 A1 | 6/2008 | Evermann et al. |
| 2008/0154612 A1 | 6/2008 | Evermann et al. |
| 2008/0154870 A1 | 6/2008 | Evermann et al. |
| 2009/0012778 A1* | 1/2009 | Feng ................. G06F 17/30672 704/9 |
| 2009/0326940 A1 | 12/2009 | Markefka et al. |
| 2011/0123967 A1 | 5/2011 | Perronnin et al. |
| 2011/0231395 A1* | 9/2011 | Vadlamani ........ G06F 17/30654 707/723 |
| 2012/0136649 A1* | 5/2012 | Freising ............ G06F 17/30663 704/9 |
| 2012/0303356 A1* | 11/2012 | Boyle ............... G06F 17/30672 704/9 |
| 2013/0204610 A1 | 8/2013 | Wu |
| 2014/0067534 A1* | 3/2014 | Wolfram ........... G06F 17/30864 705/14.54 |
| 2014/0114649 A1* | 4/2014 | Zuev .................... G06F 17/289 704/9 |
| 2014/0280114 A1* | 9/2014 | Keysar .............. G06F 17/30864 707/730 |
| 2014/0310306 A1* | 10/2014 | Sawczuk ........... G06F 17/30684 707/769 |
| 2014/0337383 A1* | 11/2014 | Boyle ............... G06F 17/30542 707/780 |
| 2014/0358889 A1* | 12/2014 | Shmiel ............. G06F 17/30654 707/710 |

\* cited by examiner

METHOD AND SYSTEM FOR PROVIDING ANSWERS TO QUERIES

CROSS-REFERENCE TO RELATED APPLICATION

The present application claims the benefit of U.S. Provisional Patent Application No. 61/892,189, filed on Oct. 17, 2013, entitled "METHOD AND SYSTEM FOR PROVIDING ANSWERS TO QUERIES," which is hereby incorporated by reference in its entirety.

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Wolfram|Alpha®, a computational knowledge engine developed by Wolfram Research, Inc., provides an online service that answers factual queries by retrieving an answer from curated data, or computing the answer. Wolfram|Alpha® differs from traditional search engines in that Wolfram|Alpha® computes and/or provides an answer rather than providing a list of documents or web pages that might contain the answer.

Intelligent personal assistants are now available for use with smart phones and tablet computers. For example, some intelligent personal assistants use a natural language user interface to answer questions, make recommendations, and perform actions by delegating requests to a set of Web services. For instance, intelligent personal assistants may utilize speech recognition techniques to determine a user input, and may utilize speech synthesis techniques to provide an output to the user. Many currently available intelligent personal assistants are powered by Wolfram|Alpha®. For example, many currently available intelligent personal assistants forward user questions to Wolfram|Alpha®, which then determines answers to those questions and returns the answers to the intelligent personal assistants.

SUMMARY OF THE DISCLOSURE

Figure 1:
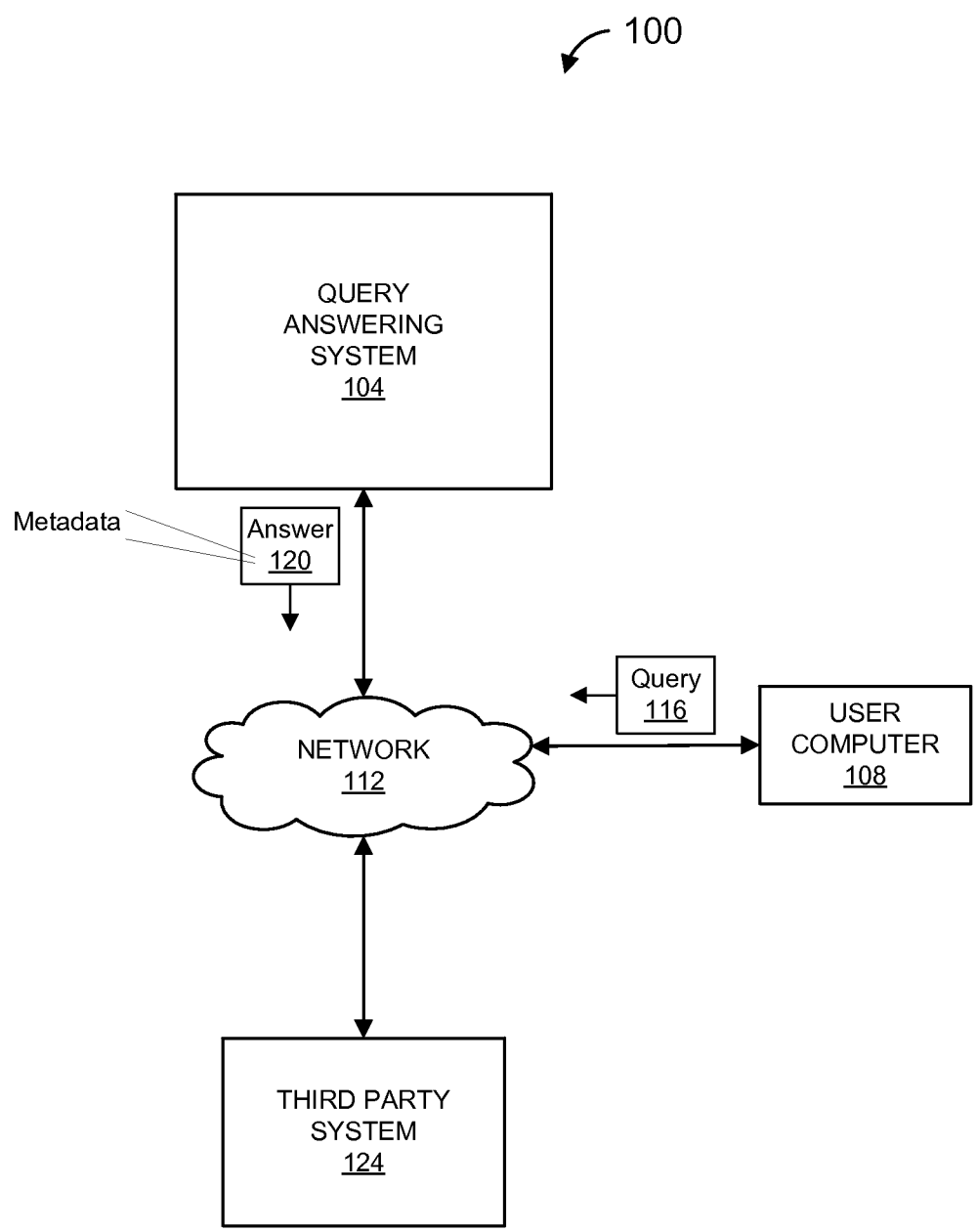
FIG. 1 is a diagram of an example system for providing answers to queries, according to an embodiment.

In one embodiment, a method for providing information includes receiving, at one or more processors, a natural language query; determining, at one or more processors, an answer to the natural language query; formatting, at one or more processors, one or more messages that include: the answer, and metadata corresponding to the answer, the metadata including information to enable construction by a computing device, using the metadata, of a sentence or statement that recites and/or describes the answer.

In another embodiment, a system for providing information comprises a network interface device to communicatively couple to a communication network, and one or more processors configured to: receive a natural language query; determine an answer to the natural language query; format one or more messages that include: the answer, and metadata corresponding to the answer, the metadata including information to enable construction by a computing device, using the metadata, of a sentence or statement that recites and/or describes the answer; and cause the network interface device to transmit the one or more messages via the communication network.

In yet another embodiment, a method for providing information includes receiving, at one or more processors, a natural language query; receiving, via a communication network, one or more first messages that include an answer to the natural language query, and metadata corresponding to the answer, the metadata including information to enable construction by a computing device, using the metadata, of a natural language sentence or statement that recites and/or describes the answer; and generating, at one or more processors, the natural language sentence or statement that recites and/or describes the answer using the metadata in the one or more first messages.

In still another embodiment, a system for providing information comprises a network interface device to communicatively couple to a communication network; one or more processors configured to: receive a natural language query, receive one or more first messages that include an answer to the natural language query, and metadata corresponding to the answer, the metadata including information to enable construction by a computing device, using the metadata, of a natural language sentence or statement that recites and/or describes the answer; and generate the natural language sentence or statement that recites and/or describes the answer using the metadata in the one or more first messages.

DETAILED DESCRIPTION

Embodiments described herein generally relate to a system that determines an answer to a query, and then, when providing the answer, additionally provides metadata related to the answer and, in some embodiments, the question. In some embodiments, the metadata includes information that facilitates constructing a syntactically correct natural language sentence or statement (which may be short of a grammatically correct sentence) that recites or indicates the answer. In some embodiments, the metadata also includes information that facilitates constructing a syntactically correct sentence or statement that recites an interpretation of the query by the system. In some embodiments, a recitation of the interpretation of the query by the system may help a user to confirm that the answer generated by the system corresponds to an interpretation of the query as intended by the user, as opposed to a misinterpretation of the query. In some embodiments, metadata, such as described above, can be used by a user computer to construct a syntactically correct sentence or statement that recites or indicates the answer (and, in some embodiments, an interpretation of the query) and to present the sentence or statement to the user. For example, the user computer may display the sentence or statement on a display device. As another example, the user computer may include a text-to-speech system that renders the sentence or statement as an audio signal.

System Overview

FIG. 1 is block diagram of an example system 100 in which example techniques for providing answers to queries may be implemented, in some embodiments. The system 100 includes a query answering system 104 configured to generate answers to queries as opposed to merely providing links to web pages having words that match words in a query. In an embodiment, the query answering system 104 attempts to understand the meaning of a query and then provides an answer to the query based on the understood meaning. For example, in response to a query including the term "manhattan", the query answering system 104 may determine that "manhattan" can refer to various entities such as the city in New York, various other cities in the United States, the movie "Manhattan", etc., in an embodiment. The different entities correspond to different assumptions regarding the meaning of the word "manhattan". The query answering system 104 may then choose one of the assumptions, i.e., choose an entity, and determines information about the entity to formulate an answer, in an embodiment. The information may be retrieved from a database of the query answering system 104 or a database communicatively coupled to the query answering system 104, in various embodiments. In some embodiments, the query answering system 104 is configured to utilize techniques described in U.S. patent application Ser. No. 12/780,685, entitled "Assumption Mechanism for Queries," filed May 14, 2010, which is hereby incorporated by reference in its entirety.

Additionally or alternatively, the query answering system 104 may be configured to perform mathematical calculations as part of determining an answer, for example, rather than just retrieving an answer from a database, in some embodiments. For instance, the query answering system 104 may be configured to determine an answer to a query at least by (i) determining a formula corresponding to the query, and (ii) calculating an answer according to the formula. In some embodiments, the query answering system 104 is configured to utilize techniques described in U.S. Patent Application Publication No. 2008/0066052, published on Mar. 13, 2008, which is hereby incorporated by reference in its entirety.

In some embodiments, the query answering system 104 includes, or is communicatively coupled to, an entities database that stores categorized information about entities such as geographical entities (e.g., cities, states, countries, places, bodies of water, etc.), people, companies, animals, plants, etc. The entities database optionally may include attributes and/or properties of the entities. For example, for each city, the entities database may also store properties such as population, square area, etc. In embodiments that include an entities database, the query answering system 104 may query the entities database to determine information for responding to a user query.

The system 100 also includes a user computer 108 configured to permit a user to input queries. In some embodiments, the user computer 108 is coupled to the query answering system 104 via a communications network 112. A user enters a query via the user computer 108. For example, the user may enter a query via a web page, a graphical user interface provided by an app, or other suitable display that is displayed on a display device of, or coupled to, the user computer 108. As another example, the user computer 108 includes a microphone and a speech recognition system, and the user may enter a query by speaking the query. In this example, the user computer 108 determines the query using the speech recognition system. The user computer 108 then generates a query message 116 that includes an indication of the query entered via the user computer 108. Next, the user computer 108 transmits the query message 116 via the network 112.

The query answering system 104 determines an answer to the query as discussed above, where the query is indicated by the query message 116. After determining the answer, the query answering system 104 may generate an answer message 120 that includes an indication of the answer. As discussed in more detail below, the query answering system 104 may be configured to generate metadata associated with the answer and to include the metadata in the answer message 120. The query answering system 104 then transmits the answer message 120 via the network.

In some embodiments and/or scenarios, the user computer 108 may transmit the query message 116 to the query answering system 104 via the network 112. Then, the query answering system 104 determines an answer to the query in response to the query message 116. Next, the query answering system 104 generates and transmits the answer message 120 to the user computer 108 via the network 112.

In some embodiments, the system 100 also includes a third party system 124 corresponding to, for example, a mobile communications provider, a service provider, etc. In embodiments having the third party system 124, and in at least some scenarios, the user computer 108 may transmit the query message 116 to the third party system 124 via the network 112. The third party system 124 may then forward the query message 116 to the answering system 104, in an embodiment. Alternatively, the third party system 124 may modify the query message 116 prior to sending the query message 116 to the query answering system 104. As another alternative, the third party system 124 may generate a new query message based on the query in the original query message 116, and then transmit the new query message to the query answering system 104. The query answering system then determines an answer in response to the query message from the third party system 124.

In embodiments having the third party system 124, and in at least some scenarios, the query answering system 104 may transmit the answer message 120 to the third party system 124 via the network 112. The third party system 124 may then forward the answer message 120 to the user computer 108, in an embodiment. Alternatively, the third party system 124 may modify the answer message 120 prior to sending the answer message 120 to the user computer 108. As another alternative, the third party system 124 may generate a new answer message based on the answer in the original answer message 120, and then transmit the new answer message to the user computer 108.

In some embodiments, the third party system 124 and/or the user computer 108 is configured to analyze the metadata and to use the metadata to construct a syntactically correct sentence or statement that recites or indicates the answer (and, in some embodiments, an interpretation of the query) and to present the sentence or statement to the user. For example, the third party system 124 may construct such a sentence or statement and add the sentence or statement to the answer message 120 before forwarding the answer message 120 to the user computer 108, or the third party system 124 may include the sentence or statement in a new answer message before forwarding the new answer message to the user computer 108. As another example, the user computer 108 itself may construct such a sentence or statement using the metadata.

In some embodiments, the user computer 108 may display the sentence or statement on a display device of, or coupled to, the user computer 108. In some embodiments, the user computer 108 may include a text-to-speech system that renders the sentence or statement as an audio signal.

The query answering system 104, in various embodiments, is implemented on a computing system comprising such as one or more of (i) one or more servers, (ii) one or more workstations, (iii) a mainframe, etc. In some embodiments, the query answering system 104 includes one or more processors and one or more memory devices, the one or more processors configured to execute machine readable instructions stored in the one or more memory devices. In some embodiments, the query answering system 104 includes one or more hardware devices, such as an application-specific integrated circuit (ASIC), a custom integrated circuit, a neural network device, etc. The query answering system 104 includes a network interface configured to transmit and receive data via the network 112.

The user computer 108, in various embodiments, comprises a personal computer, a tablet computer, a smart mobile phone, a personal digital assistant (PDA). In some embodiments, the user computer includes one or more processors and one or more memory devices, the one or more processors configured to execute machine readable instructions stored in the one or more memory devices. In some embodiments, the user computer 108 includes one or more hardware devices, such as an ASIC, a custom integrated circuit, etc. The user computer 108 includes a network interface configured to transmit and receive data via the network 112. In some embodiments, the user computer 108 includes a display device. In some embodiments, the user computer 108 includes an audio input system (which includes a microphone and an analog-to-digital converter) and a speech recognition system. In some embodiments, the user computer 108 includes a text-to-speech system and an audio output system (which includes a digital-to-analog converter and a speaker).

The third party system 124, in various embodiments, is implemented on a computing system comprising such as one or more of (i) one or more servers, (ii) one or more workstations, (iii) a mainframe, etc. In some embodiments, the third party system 124 includes one or more processors and one or more memory devices, the one or more processors configured to execute machine readable instructions stored in the one or more memory devices. In some embodiments, the third party system 124 includes one or more hardware devices, such as an ASIC, a custom integrated circuit, etc. The third party system 124 includes a network interface configured to transmit and receive data via the network 112.

The communications network 112 may include one or more of a local area network (LAN), a wireless LAN, a wide area network (WAN), a metropolitan area network, a mobile communications network, a satellite communications network, the Internet, etc.

In some embodiments, the query message 116 is not generated in response to, or based on, a query entered by a user. For example, in some embodiments, the query message 116 includes a computer-generated query, such as a query generated by an Internet bot (e.g., a software application) configured to automatically and repeatedly submit NL queries to the query answering system 104 with the intention of aggregating the resulting data. In such embodiments, the system 100 may omit the user computer 108, and may include a query generation system (not shown) implemented on a computing system comprising such as one or more of (i) one or more personal computers, (ii) one or more tablet computers, (iii) one or more smart mobile phones, (iv) one or more PDAs, (v) one or more servers, (vi) one or more workstations, (vii) a mainframe, etc. In some embodiments, the query generation system includes one or more processors and one or more memory devices, the one or more processors configured to execute machine readable instructions stored in the one or more memory devices. In some embodiments, the query generation system includes one or more hardware devices, such as an ASIC, a custom integrated circuit, etc. The query generation system may include a network interface configured to transmit and receive data via the network 112.

Figure 2:
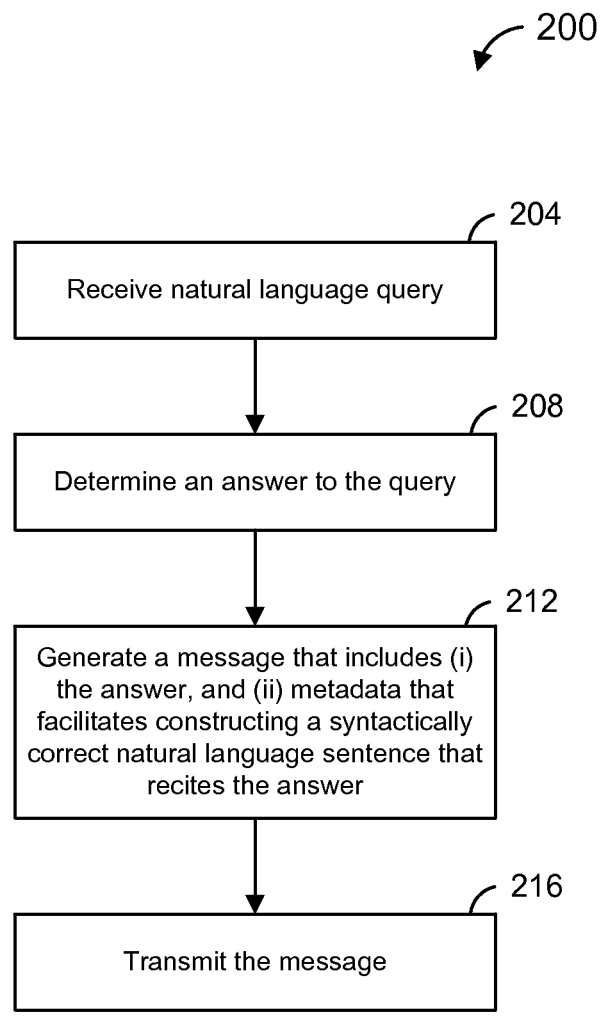
FIG. 2 is a flow diagram of an example method for providing answers to queries, according to an embodiment.

FIG. 2 is a flow diagram of an example method 200 that may be implemented by the answering system 104 of FIG. 1, in some embodiments. For explanatory reasons, the method 200 is described with reference to FIG. 1. However, in some embodiments, the method 200 may be implemented in a suitable system different than the system of FIG. 1.

At block 204, a natural language (NL) query is electronically received. For example, the answering system 104 receives the query message 116 via the network 112, where the query message 116 includes an NL query, in an embodiment.

At block 208, an answer to the query is determined. For example, the answering system 104 determines an answer to the query using techniques such as described above, in an embodiment.

At block 212, a message is generated to include (i) the answer determined at block 208, and (ii) metadata that will facilitate constructing a syntactically correct NL sentence or statement that recites, describes, and/or indicates the answer. For example, the answering system 104 generates an answer message 120, such as described above, in an embodiment. Metadata may be determined by the answering system 104 in conjunction with determining the answer, and/or the answering system 104 may determine metadata separately from and/or after determining the answer.

At block 216, the message generated at block 212 is electronically transmitted. For example, the answering system 104 may transmit the answer message 120 via the network 112. In some embodiments and/or scenarios, the answering system 104 transmits the answer message 120 to the user computer 108. In some embodiments and/or scenarios, the answering system 104 transmits the answer message 120 to the third party system 124. In some embodiments, the user computer 108 uses the metadata to construct a syntactically correct NL sentence or statement that recites or indicates the answer. In other embodiments, the third party system 124 uses the metadata to construct a syntactically correct NL sentence or statement that recites or indicates the answer, and then transmits the NL sentence or statement to the user computer 108.

In some embodiments, metadata is not transmitted in response to an NL query in all circumstances. For example, in some embodiments, the user computer 108 and/or the third party system 124 is configured to determine whether to request metadata in conjunction with an answer to an NL query. Additionally, in some embodiments, the user computer 108 and/or the third party system 124 is configured to include in a query message, such as the query messages described above, an indication whether an answer message (responsive to the query message) should include answer metadata. Further, in some embodiments, the query answering system 104 is configured to include metadata in an answer message conditionally based on whether metadata was requested by the user computer 108 and/or the third party system 124 (e.g., whether the query message indicates that metadata should be included in an answer message).

In some embodiments, the answer and the metadata are transmitted in separate messages. For example, one or both of the separate messages may include information that indicates an association between the answer and the metadata.

Answer Metadata

As discussed above, metadata is provided (e.g., in the answer message 120) to facilitate constructing a syntactically correct NL sentence or statement that recites or indicates the answer, in some embodiments.

In some embodiments, the metadata includes an indication of an object type of the answer. The object type of the answer may be useful for constructing an NL sentence or statement that recites the answer and that sounds, to a listener or reader, syntactically correct. For example, if the answer is a date, a sentence or statement that recites the answer may include the preposition "on" before reciting the date (i.e., to form a prepositional phrase, for example "on Jul. 15, 2001"), whereas if the answer is of a different object type (e.g., a geographical location), a sentence or statement that recites the answer may include a different preposition such as "in" before reciting the answer (e.g., "in Chicago, Ill."), or no preposition. As another example, if the answer is a time, a sentence or statement that recites the answer may include the preposition "at" before reciting the time (i.e., to form a prepositional phrase, for example "at 7:34 PM"). In various embodiments, none, one, or any suitable combination of multiple ones, of the following object types may be utilized: Quantity (e.g., a number with a unit), Math (e.g., a general math expression), Number (e.g., a number integer, real, rational, etc.), String (e.g., a raw string of unspecified type; may be a phrase), Date, Image (e.g., an actual image to which a sentence can refer ("Here is a picture of Mt. Everest"), etc. In some embodiments, none, one, or any combination of multiple ones, of the following object types may be utilized, additionally or alternatively: Time (e.g., a time of day), Thing, Name (e.g., a name of a person or thing), Place, etc. In some embodiments in which the query answering system 104 maintains an entity database, none, one, or any combination of multiple ones, of object types such as the Wolfram|Alpha® entity types listed in the attached appendix may be utilized, additionally or alternatively.

In some embodiments, the metadata includes an indication of how the NL query was interpreted by the query answering system 104. The indication of how the NL query was interpreted may be useful for constructing an NL sentence or statement that provides an indication of how the query was interpreted and that sounds, to a listener or reader, syntactically correct. For example, if the query is a simple arithmetic problem (e.g., with numbers less than 1000), a sentence or statement that recites the query may be phrased differently than if the query is a more complex mathematical problem. As another example, if the query asks for a conversion from one unit to another unit (e.g., how many pints in a gallon), a sentence or statement that recites the query may be phrased differently than if the query is asks for a property of an entity known to the query answering system 104 (e.g., what is the population of Chicago"). In various embodiments, none, one, or any suitable combination of multiple ones, of the following input types may be utilized: SimpleMath (e.g., simple arithmetic problem with numbers less than 1000), Math (e.g., a math problem other than SimpleMath), ConvertUnits (convert from one unit to another), Formula (e.g., a formula and/or calculator input), Miscellaneous (a question that does not fall into another category), etc. In some embodiments in which the query answering system 104 maintains an entity database, none, one, or any combination of multiple ones, of input types such as the Wolfram|Alpha® entity types listed in the attached appendix may be utilized, additionally or alternatively.

In some embodiments, the metadata includes one or more attributes of, and/or one or more qualifiers corresponding to, the answer. The attributes/qualifiers may be useful for constructing an NL sentence or statement that recites the answer and that sounds, to a listener or reader, syntactically correct. For example, if the answer is an approximation of a number, a sentence or statement that recites the answer may include the descriptive word "about" or "approximately" before reciting the date (e.g., "the population of Chicago is about two and a half million people"), whereas if the answer is exact, a sentence or statement that recites the answer may omit words such as "about" and "approximately" (e.g., "the total number of protons in aluminum is 13"). As another example, if there are suppressed annotations associated with the answer (e.g., assumptions footnotes, parenthetical remarks, etc.), a sentence or statement that recites the answer may phrased to signal to the reader/listener that the answer is qualifier (e.g., "It looks like . . . "). In various embodiments, none, one, or any suitable combination of multiple ones, of the following attribute/qualifier types may be utilized: Value (e.g., a text version of the answer), Rounded (e.g., a value has been rounded to a few digits for presentation purposes), Annotated (e.g., there is suppressed annotation associated with the answer, such as assumptions, footnotes, parenthetical remarks, etc.), etc.

In some embodiments, the metadata includes an indication of which template of a plurality of sentence or statement templates should be used to construct a sentence or statement that recites the answer. In an embodiment, the indication of which template to use may also be used to indicate whether no template should be used. For example, a first template may be a generic template such as "The result is <answer>," or "It looks like the answer is <answer>," where <answer> indicates where the answer generated by the query answering system 104 should be inserted in the sentence or statement, possibly with one or more qualifiers. A second template may be utilized when the query answering system 104 was unable to answer the query, but instead determined some other result that may be of interest to the user: "I have <resulttype> for you," where <resulttype> indicates an object type of the result determined by the query answering system 104. For example, when the resulttype is "image," the second template may be utilized to generate a sentence or statement such as "I have an image for you."

In some embodiments, the metadata may include an indication of a sentence or statement template tailored to a particular category of results. For example, in various embodiments, none, one, or any suitable combination of multiple ones, of the following sentence or statement templates may be utilized: a template to be used to recite a property of an entity known to the query answering system 104, a template to be used to recite a date associated with an entity known to the query answering system 104, a template to be used to recite a definition of a word, a template to be used to recite a conversion from one unit to another unit, etc.

In some embodiments, the metadata may include one or more variables that can be used to construct an NL sentence or statement that sounds syntactically correct. For example, one or more variables may correspond to sentence or statement components that may be utilized to construct a sentence or statement. For instance, in various embodiments, none, one, or any suitable combination of multiple ones, of the following variables may be utilized: property:value (a name of a property of an entity known to the query answering system 104), property:article (an article (e.g., "a", "an", "the", etc.) that should be used before reciting the property in the sentence or statement), property:preposition (a preposition (e.g., "of", "at", "in", etc.) to be used between the property and the entity in the NL sentence or statement), property:verb (a verb (e.g., "is", "are", etc.) to be used between the property and the entity in the NL sentence or statement), entity:value (a name of an entity known to the query answering system 104), entity:article (an article (e.g., "a", "an", "the", etc.) that should be used before reciting the entity in the sentence or statement), entity:type (an object type of the entity (e.g., person, country, city, etc.), entity:pronunciation (a string representing a pronunciation of the entity (e.g., "Washington D.C.")), result:value (the answer to the query), result:pronunciation (a string representing a pronunciation of the answer (e.g., "p u" for reciting the chemical symbol of Plutonium)), etc.

In some embodiments, the metadata may include pronunciation information to assist generation of sentence or statement that sounds natural. For example, the metadata may include a phonetic spelling of a word or words, a Name, etc., corresponding to an answer, in some embodiments. For instance, the metadata may include a phonetic spelling of an answer, or part of the answer, where the phonetic spelling uses phonetic notation specified by the International Phonetic Alphabet (IPA), in an embodiment. In some embodiments, the query answering system 104 or another suitable system may use the WordData function of Wolfram|Alpha®, or another suitable technique or system, to obtain a phonetic spelling of a word. For example, the WordData function of Wolfram|Alpha® and Mathematica®, with the PhoneticForm argument, returns the IPA phonetic representation of a word, name, etc.

As discussed above, in some embodiments, the metadata may include an indication of which template of a plurality of sentence or statement templates should be used to construct a sentence or statement that recites the answer. Each of at least some of such templates may indicate how variables (discussed above) are to be arranged to construct a sentence or statement. For example, in one embodiment, when the answer is a property of a known entity, a template that may be used is:

```
"<Property:article:> <Property:value> <Property:preposition:of>
<Entity:article:><Entity:value> <Property:verb:is> <Result>"
```

For example, a sentence constructed using this template may be "The height of Mt. Everest is about 29000 feet", where "The" is the <Property:article:>, "height" is the <Property:value>, "of" is the <Property:preposition:of>, "Mt. Everest" is the <Entity:value>, "is" is the <Property:verb:is >, and "29000 feet" is the <Result>, and where the value of the <Entity:article:> is "none" and thus there is no article before Mt. Everest. In this example, the <Result> had an attribute "Rounded", and thus the word "about" was inserted before the <Result>.

As another example, in one embodiment, when the answer is a property of a known entity as of a particular date, a template that may be used is:

```
"<Property:article:> <Property:value> <Property:preposition:of>
<Entity:article:> <Entity:value> <Date:preposition:in> <Date:value>
<Property:verb:was> <Result>"
```

For example, a sentence constructed using this template may be "The population of Norway in 1995 was about 4.4 million people", where "The" is the <Property:article:>, "population" is the <Property:value>, "of" is the <Property:preposition:of >, "Norway" is the <Entity:value>, "in" is the <Date:preposition:in >, "1995" is the <Date:value>, "was" is the <Property:verb:was>, and "4.4 million people" is the <Result>, and where the value of the <Entity:article:> is "none" and thus there is no article before Norway. In this example, the <Result> had an attribute "Rounded", and thus the word "about" was inserted before the <Result>.

As another example, in one embodiment, when the answer is a conversion from one unit to another unit, a template that may be used is:

"<InputQuantity:value> converts to <Result>"

For example, a sentence or statement constructed using this template may be "10 miles converts to about 16.1 kilometers", where "10 miles" is the <InputQuantity:value>, and "16.1 kilometers" is the <Result>. In this example, the <Result> had an attribute "Rounded", and thus the word "about" was inserted before the <Result>.

As can be seen from the discussion of the example templates above, information in the metadata may be utilized to construct a sentence or statement that varies from the template. For instance, in examples above, a template may indicate that an article (e.g., "the") be used before a word in the sentence or statement, but information in the metadata (e.g., <Entity:article:>) may indicate that an article should not be used, contrary to the template. As another example, information in the metadata (e.g., an attribute of the result) may indicate that an additional word (e.g., "about"), not in the template, be included in the sentence or statement.

In some embodiments, the metadata may include an example sentence or statement that recites the answer. The example sentence or statement may illustrate (e.g., to a developer) how an answer can be synthesized from variables or other elements specified by the metadata.

In some embodiments, the metadata may include an indication of a particular voice and/or a particular manner to be used by the user computer 108 when reciting the answer. For example, the metadata may indicate whether a female voice or a male voice should be utilized. As another example, the metadata may indicate which age of voice should be used from a plurality of voices corresponding to different ages of speaker (e.g., the plurality of voices may include two or more of a voice corresponding to a toddler, a voice corresponding to a child, a voice corresponding to an adolescent, a voice corresponding to a young adult, a voice corresponding to a middle age person, a voice corresponding to an elderly person, etc.). As yet another example, the metadata may indicate which emotional voice should be utilized from a plurality of voices corresponding to different emotions (e.g., the plurality of voices may include two or more of a serious voice, a happy voice, a sad voice, a concerned voice, a mad voice, etc.). As yet another example, the metadata may indicate which accent should be utilized from a plurality of voices corresponding to different accents (e.g., the different accents may include two or more of a Mid-West U.S. accent, New England accent, a New York accent, a southeast U.S. accent, a Canadian accent, an English accent, an Irish accent, an Australian accent, etc.).

In some embodiments, the metadata may include one or more indications of how particular words in the recitation should be spoken. For example, the metadata may indicate a relative pitch to be used when reciting a word or phrase in comparison to other words in the recitation. As another example, the metadata may indicate that a particular a word or phrase should be emphasized.

Complex Answer Objects

In some embodiments, an answer to a query may be an object more complex than a word, a name, a phrase, or a number. For example, in some embodiments and/or scenarios, an answer to a query may include a list of several objects, a table, a plot, a picture, etc. In some embodiments, the metadata may include information that indicates how a complex object may be described, summarized, etc., in words. For example, in response to a query "What are the largest cities in America?", the answer may be a list of five U.S. cities. In this example, the metadata may indicate that the answer is a list. The metadata may also indicate the items in the list are of entity type "cities." Thus, such metadata may be used to construct a sentence or statement such as "Here is a list of the five largest cities in the United States." In some embodiments, the metadata may include a sentence or statement that describes the object, e.g., "Here is a list of the five largest cities in the United States." In some embodiments, the user computer 108 or the third party system 124 may be configured to use the metadata to recite at least some elements of the list, e.g. "The five largest cities in the United States are New York City, N.Y., Los Angeles, Calif., Chicago, Ill., Houston, Tex., and Philadelphia, Pa. In some embodiments and/or scenarios in which only some elements of a list are recited, the user computer 108 or the third party system 124 may be configured to prompt whether more elements of the list should be recited, e.g., "Would you like to hear the next five largest cities in the United States?"

As another example, in response to a query "history of msft", the answer may include a plot. In this example, the metadata may indicate that the answer is a plot. The metadata may also indicate information regarding the plot such as units of the axes (e.g., date and stock price of Microsoft Corporation), ranges of the axes, etc. Thus, such metadata may be used to construct a sentence or statement such as "Here is a plot of the stock price of Microsoft Corporation over the past year." In some embodiments, the metadata may include a sentence or statement that describes the object, e.g., "Here is a plot of the stock price of Microsoft Corporation over the past year."

As another example, in response to a query "what did Niels Bohr look like," the answer may include a picture. In this example, the metadata may indicate that the answer is a picture. The metadata may also indicate information regarding the picture such as whether it is a drawing or a photograph, whether it is in color, a summary of the content of the picture, when the picture was created, etc. Thus, such metadata may be used to construct a sentence or statement such as "Here is a photograph of Niels Bohr taken in 1932." In some embodiments, the metadata may include a sentence or statement that describes the object, e.g., "Here is a photograph of Niels Bohr taken in 1932."

In some embodiments, the third party system 124 and/or the user computer 108 is configured to construct a statement that describes, summarizes, and/or recites some data in a complex object such as described above. For example, the third party system 124 may construct such a statement and add the statement to the answer message 120 before forwarding the answer message 120 to the user computer 108, or the third party system 124 may include the statement in a new answer message before forwarding the new answer message to the user computer 108. As another example, the user computer 108 itself may construct such a statement.

For example, when the answer includes a list, the third party system 124 and/or the user computer 108 may be configured to construct a sentence or statement that describes the list and/or recites at least some elements of the list. For instance, if the list includes 100 elements, the constructed sentence might include only the first five elements (e.g., "The answer is a list of 100 cities, and the first five cities are . . . ").

As another example, when the answer includes a table, the third party system 124 and/or the user computer 108 may be configured to construct a sentence or statement that describes the table, at least some aspects of the table, and/or recites at least some elements of the table. For instance, if the table is a table of cities and their associated populations, a constructed statement or statements might include a description of the table (e.g., "a table of populations of cities"), aspects of the table (e.g., there are 20 cities listed), and/or elements of the table (e.g., "the first row includes New York City and eight million").

As another example, when the answer includes a picture, the third party system 124 and/or the user computer 108 may be configured to construct a sentence or statement that describes the picture and/or aspects of the picture (e.g., whether it is a drawing or a photograph, whether it is in color, a summary of the content of the picture, when the picture was created, etc.). Thus, the user computer 108 may be configured to construct a sentence or statement such as "The answer is a photograph of Niels Bohr taken in 1932."

Requesting Additional Information for Computing Answer

In some embodiments, the answering system 104 may be configured to prompt a user to provide additional information when the answering system 104 is unable to determine an answer, for example, due to ambiguity of the query. In such scenarios, the answering system 104 may be configured to exchange messages with the user computer 108 and/or the third party system 124 to prompt and receive additional information. For example, the answering system 104 may generate and send messages that include natural language questions asking for further information. The user computer 108 may be configured to display such questions on a display device of, or coupled to, the user computer 108. In some embodiments, the user computer 108 may include a text-to-speech system that renders the question as an audio signal. In some embodiments, the user computer 108 may include a speech recognition system converts answers spoken by the user to text for sending to the answering system 104 in response to the messages from the answering system 104 asking for additional information. In some embodiments, a user may utilize a touch screen, a keyboard, a keypad, etc., to enter textual answers for sending to the answering system 104 in response to the messages from the answering system 104 asking for additional information.

In some embodiments, related messages that exchange queries, answers, prompts for additional information, responses to such prompts, etc., may include information to indicate a relationship between the related messages. For example, in some embodiments, a first message (e.g., a query, a first response to the query, etc.) may include a unique (at least within a suitable time period) identifier (ID), such as a session ID. The answering system 104, the user computer 108, and/or the third party system 124 are configured to generate subsequent messages related to the first message to include the session ID, in some embodiments. In such embodiments, the answering system 104, the user computer 108, and/or the third party system 124 analyze session IDs in received messages to determine which messages are related.

In other embodiments, a "stateless" approach is utilized with respect to messages that exchange queries, answers, prompts for additional information, responses to such prompts, etc. For example, in some embodiments, query messages and/or answer messages may be generated to include information regarding previous queries, previous responses to queries, etc., to facilitate determining context of a current query, a current response to a current query, etc. In an embodiment, query messages and/or answer messages may be generated to include a suitable number of previous queries, a suitable number of previous responses to queries, etc.

As an illustrative example, an initial user query message includes the query "How many calories will I burn on my run?" A first response message includes a request for more information such as "I need more information to answer that. How far will you run?" Additionally, the response message includes an indication of the initial query "How many calories will I burn on my run?" and, optionally, metadata associated with an analysis of the initial query by the answering system 104.

A second user message may include the requested information "10 kilometers." Additionally, the second user message may includes an indication of the initial query "How many calories will I burn on my run?" and, optionally, metadata associated with an analysis of the initial query by the answering system 104. Further, the second user message may include an indication of the request for additional information "How far will you run?" The answering system 104 may utilize such additional information to determine a context of the response "10 kilometers." Namely, the answering system 104 may utilize such additional information to determine that the response "10 kilometers" is in connection with the initial query "How many calories will I burn on my run?"

A second response message includes a second request for more information such as "How fast will you run?" Additionally, the second response message includes an indication of the initial query "How many calories will I burn on my run?" and, optionally, metadata associated with an analysis of the initial query by the answering system 104. Also, the second response message may include an indication of the first request for additional information "How far will you run?" Further, the second response message may include an indication of the information in the second user message "10 kilometers."

A third user message may include the requested information "about 55 minutes." Additionally, the third user message may includes an indication of the initial query "How many calories will I burn on my run?" and, optionally, metadata associated with an analysis of the initial query by the answering system 104. Additionally, the third user message may include an indication of the first request for additional information "How far will you run?" Additionally, the third response message may include an indication of the information in the second user message "10 kilometers." Additionally, the third user message may include an indication of the second request for additional information "How fast will you run?" The answering system 104 may utilize such additional information to determine a context of the response "about 55 minutes." Namely, the answering system 104 may utilize such additional information to determine that the response "about 55 minutes" is in connection with the initial query "How many calories will I burn on my run?", the second user message "10 kilometers", the first request for additional information "How far will you run?", and the second request for additional information "How fast will you run?"

When the answering system 104 has enough information to generate an answer, the answering system 104 generates an answer message. The answer message may include metadata such as described above, in some embodiments. Additionally, the answer message may include a suitable number of previous queries, a suitable number of previous responses to queries, etc. For example, continuing with the illustrative example discussed above, the answer message may include an indication of the initial query "How many calories will I burn on my run?" and, optionally, metadata associated with an analysis of the initial query by the answering system 104. Additionally, the answer message may include an indication of the first request for additional information "How far will you run?" Additionally, the answer message may include an indication of the information in the second user message "10 kilometers." Additionally, the third user message may include an indication of the second request for additional information "How fast will you run?" Additionally, the answer message may include an indication of the information in the third user message "about 55 minutes."

In some embodiments, the answering system 104 may be configured to determine what additional information is needed to determine an answer using techniques described in U.S. Patent Application Publication No. 2008/0066052, and/or using other suitable techniques.

The answering system 104 is configured to generate and send response messages that requests for information such as described above. Additionally, the answering system 104 is configured to utilize the additional information in user messages, such as described above, to generate answers to be provided in answer messages.

The user computer 108 and/or the third party system 124 is configured to generate and send user messages such as described above. In some embodiments, the user computer 108 and/or the third party system 124 may be configured to utilize additional information in response messages from the answering system 104 to maintain, at the user computer 108 and/or the third party system 124, a state of a "session" with the answering system 104 even though the answering system 104 is configured to generate and send answer messages and response messages in a "stateless" manner.

Providing Additional Information that a User May Find Helpful

In some embodiments, the answering system 104 may be configured to predict additional information that a user may want to know or that the user would find useful. In some embodiments, the answering system 104 may transmit prompts asking whether the answering system 104 should provide such additional information. For example, if the original query is "split a $56.89 check into four", the answering system 104 may be configured to deduce that the query involves a restaurant bill. Further, the answering system 104 may be configured to deduce that tips are frequently added to restaurant bills, and thus the answering system 104 may be configured to transmit an additional prompt such as "Do you want to include a tip with that?" In some embodiments, the prompt is included with the answer to the original query, e.g., "That'll be $14.22. Do you want to include a tip with that?" To provide such additional information (e.g., a tip amount), the answering system 104 may be configured to prompt a user to provide additional information when the answering system 104 does not have enough information to compute the additional information (e.g., a percentage to use for calculating the tip).

In some embodiments, related messages that exchange information related providing such additional information may include information to indicate a relationship between the related messages. For example, in some embodiments, a first message (e.g., a query, a first response to the query, etc.) may include a unique (at least within a suitable time period) identifier (ID), such as a session ID. In other embodiments, a "stateless" approach is utilized, such as described above, in which messages may be generated to include information regarding previous messages to facilitate determining context of a current message.

In some embodiments, the answering system 104 may be configured to determine additional information that a user may want to know or that the user would find useful using techniques such as described in U.S. Patent Application Publication No. 2008/0066052, and/or using other suitable techniques.

Application Programming Interface

In some embodiments, an answer message (e.g., the answer message 120) is generated according to an application programming interface (API) that specifies how the answer, and metadata corresponding to the answer, are to be formatted within the answer message. In one specific embodiment, a user computer or a third party system may submit a query along with a request for metadata such as described above via a URL that includes (i) the query and (ii) an indication of the request for metadata (e.g., a spokenresult=true URL parameter), e.g.:

```
http://api.wolframalpha.com/v2/query.jsp?input=How+
high+is+Mount+Everest&appid=x xx&spokenresult=true
``` where "input=How+high+is+Mount+Everest" is the query. In response, a query answering system may transmit an XML output that includes:

```
<spokenresult generictemplate='TheResultIs' resulttype='Quantity'
inputtype='\MountainData' sampletext='The answer is about 29000 feet'>
    <result value='29000 feet'>
        <qualifier type='Rounded' />
    </result>
    <srtemplate name='PropertyEntity' sampletext='The height of Mount
Everest is about
    29000 feet'>
        <srvariable name='Property' value='height' article='the' />
        <srvariable name='Entity' value='Mount Everest' type='Mountain' />
        <srvariable name='Result' inherit='true' />
    </srtemplate>
</spokenresult>
``` where "spokenresult" has several attributes including "generictemplate", "resulttype", "inputtype", and "sampletext"; "result" has several attributes including "value", and "qualifier type"; "srtemplate" has several attributes including "name", and "sampletext"; additionally, there are several variables ("srvariable") associated with "srtemplate" including "Property", "Entity", and "Result"; the variable "Property" has several attributes including "value" and "article"; the variable "Entity" has several attributes including "value" and "type"; and the variable "Result" has an attribute "inherit". The example API is described in more detail in the appendix.

The example API discussed above and in the Appendix is merely illustrative. Other suitable APIs may be used in other embodiments.

Figure 3:
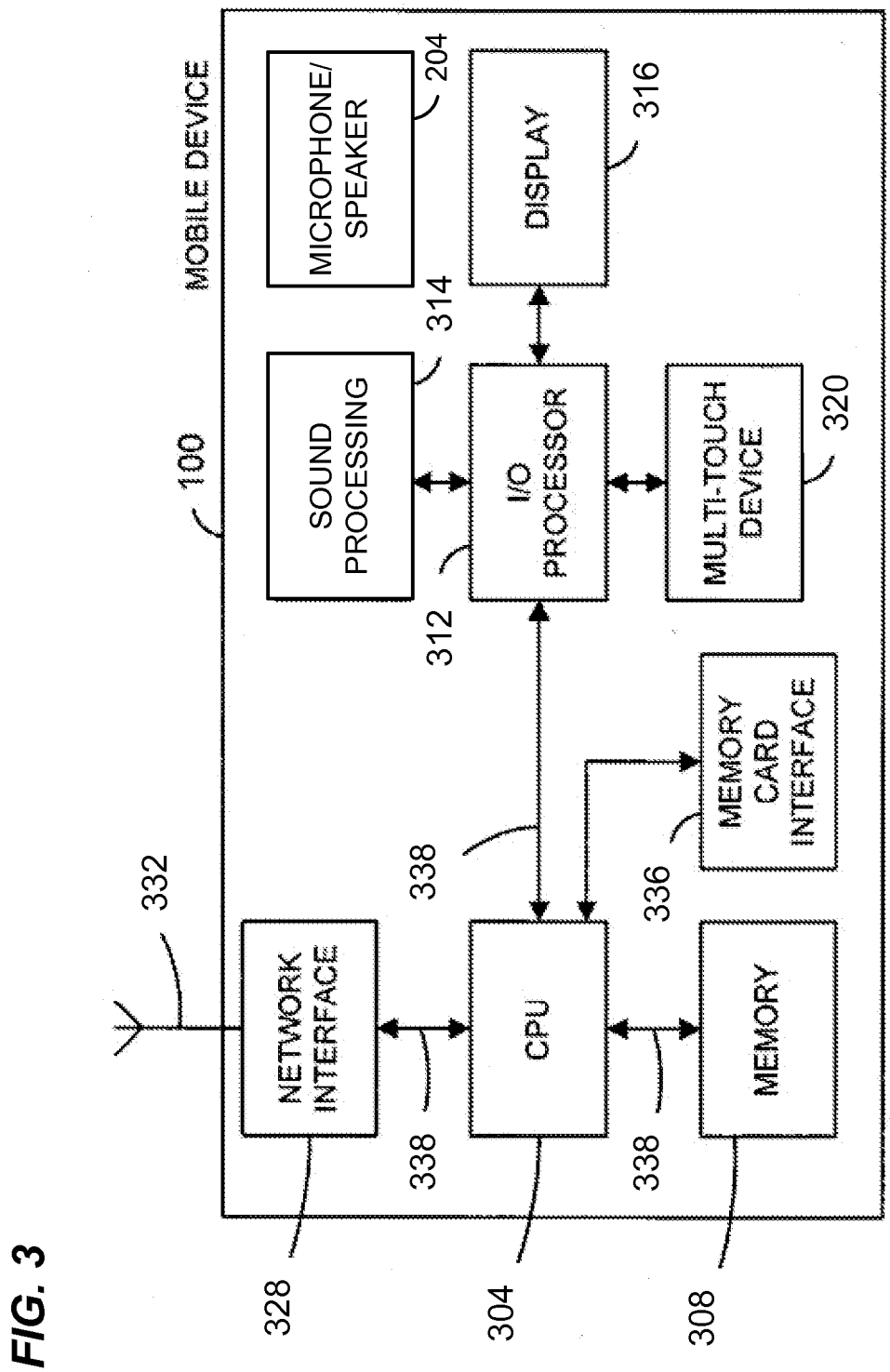
FIG. 3 is a diagram of an example computing device that can be used in the system of FIG. 1, according to an embodiment.

FIG. 3 is a block diagram of an example computing device 300 that can used to submit queries receive, in response, answers, according to an embodiment. For example, the computing device 300 may be used as the user computer 108 of FIG. 1, in some embodiments. In other embodiments, another suitable device can be used as the user computer 108, such as a smart phone, a desktop computer, a laptop computer, a workstation, etc.

The device 300 includes a central processing unit (CPU) 304 coupled to a memory 308 (which can include one or more non-transitory, tangible computer readable storage media such as random access memory (RAM), read only memory (ROM), flash memory, a hard disk drive, a digital versatile disk (DVD) disk drive, a Blu-ray disk drive, etc.). The device 300 also includes an input/output (I/O) processor 312 that interfaces the CPU 304 with a display device 316. In some embodiments, the device 300 may include a touch-sensitive device (or touch screen) 320. In some embodiments the touch-sensitive device is a multi-touch touch screen, however in other embodiments, another suitable touch screen technology, such as a single-touch touch screen, may be utilized. The I/O processor 312 also interfaces with a sound processing system 314, which is in turn coupled to a microphone and a speaker (microphone/speaker 315). The sound processing system 314 is configured to convert analog sound signals corresponding to sounds received via the microphone 315 into a digital format, and to convert digital sound signals into analog signals to be provided to the speaker 315. In some embodiments, the sound processing system 314 is configured to implement text-to-speech synthesis. In other embodiments, however, text-to-speech synthesis is implemented by the CPU 304 or another suitable processor. In some embodiments, the sound processing system 314 is configured to implement speech recognition techniques. In other embodiments, however, speech recognition is implemented by the CPU 304 or another suitable processor.

The I/O processor 312 also interfaces one or more additional I/O devices (not shown) to the CPU 304, such as one or more buttons, click wheels, a keypad, a touch pad, another touch screen (single-touch or multi-touch), lights, a speaker, a microphone, etc.

A network interface 328 is coupled to the CPU 304 and to an antenna 332. A memory card interface 336 may be coupled to the CPU 304. The memory card interface 336 is adapted to receive a memory card such as a secure digital (SD) card, a miniSD card, a microSD card, a Secure Digital High Capacity (SDHC) card, etc., or any suitable card.

The CPU 304, the memory 308, the I/O processor 312, the network interface 328, and the memory card interface 336 are coupled to one or more busses 338. For example, the CPU 304, the memory 308, the I/O processor 312, the network interface 328, and the memory card interface 336 are coupled to a bus 338, in an embodiment. In another embodiment, the CPU 304 and the memory 308 are coupled to a first bus, and the CPU 304, the I/O processor 312, the network interface 328, and the memory card interface 336 are coupled to a second bus. In other embodiments, various other suitable bus architectures are utilized.

The device 300 is only one example of a computing device 300, and other suitable devices can have more or fewer components than shown, can combine two or more components, or a can have a different configuration or arrangement of the components. The various components shown in FIG. 3 can be implemented in hardware, by a processor executing software instructions, or by a combination of both hardware and processor executing software instructions software, including one or more signal processing and/or application specific integrated circuits. Furthermore, the device 300 may be a mobile computing device (such as a mobile phone, tablet, e-reader, etc.), a desktop computer, laptop computer or other computing device. Alternatively, the device 300 may be a single purpose computing device, such as a touch screen based calculator.

The CPU 304 executes computer readable instructions stored in the memory 308. The I/O processor 312 interfaces the CPU 304 with input and/or output devices, such as the display 316, the touch screen 320, and the sound processing system 314. The I/O processor 312 can include a display controller (not shown), a touch screen controller (not shown), and a sound processing system controller (not shown).

The network interface 328 facilitates communication with a wireless communication network such as a wireless local area network (WLAN), a wide area network (WAN), a personal area network (PAN), etc., via the antenna 332. In other embodiments, one or more different and/or additional network interfaces facilitate wired communication with one or more of a local area network (LAN), a WAN, another computing device such as a personal computer, a server, etc. In some embodiments having one or more additional network interfaces, the device 300 includes one or more additional antenna.

Software components (i.e., sets of computer readable instructions executable by the CPU 304) are stored in the memory 308. The software components can include an operating system, a communication module, a graphics module, a speech input/output module, and applications such as a web browser application, a word processing application, an e-mail application, a personal assistant application, or other suitable applications. The operating system can include various software components and/or drivers for controlling and managing general system tasks (e.g., memory management, etc.) and can facilitate communication between various hardware and software components. The communication module can facilitate communication with other devices via the network interface 328.

The speech input/output module may be used to generate an audio signal corresponding to a NL sentence or utterance being spoken, and may be used to convert a spoken NL sentence or utterance to text. The speech input/output module can include various software components for performing various operations related to converting text to speech, such as interfacing with the sound processing system 314, performing text-to-speech operations, etc. The speech input/output module can include various software components for performing various operations related to speech recognition, such as interfacing with the sound processing system 314, performing speech recognition operations, etc.

An application stored in the memory 308, such as the personal assistant application or another suitable application, may be configured to, when executed, generate query messages and user messages such as discussed above, analyze answer messages and response messages such as described above, and interact with the speech input/output module to render NL output and receive NL input. In some embodiments, an application stored in the memory 308, such as the personal assistant application or another suitable application, may be configured to, when executed, utilize metadata such as described above to construct a sentence or statement that rephrases the query and/or recites the answer, such as described above.

Any of the techniques described above, including the blocks described with reference to FIGS. 1-3, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, the machine readable instructions may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

Appendix

Spoken Result API call

The spoken result is returned from the WolframAlpha API by adding a spokenresult=true URL parameter to the request. E.g., http://api.wolframalpha.com/v2/query.jsp?input=How+high+is+Mount+Everest&appid=xxx&spokenresult=true returns as part of the output the XML fragment:

```
<spokenresult generictemplate='TheResultIs' resulttype='Quantity' inputtype='.MountainData'
        sampletext='The answer is about 29000 feet'>
   <result value='29000 feet'>
    <qualifier type='Rounded' />
   </result>
   <srtemplate name='PropertyEntity' sampletext='The height of Mount Everest is about 29000 feet'>
      <srvariable name='Property' value='height' article='the' />
      <srvariable name='Entity' value='Mount Everest' type='Mountain' />
      <srvariable name='Result' inherit='true' />
   </srtemplate>
</spokenresult>
```

Syntax Reference

- <spokenresult> attributes

- generictemplate

This indicates a named generic template that the result should fit into.

TheResultIs: The main result (with possible qualifiers) should fit into a sentence like "The result is <result>" or "It looks like the answer is <result>".

IHaveForYou: No explicit result is available, but the resulttype can be used to produce a sentence of the type "I have <resulttype> for you". E.g., "I have an image for you" for resulttype="Image".

SRTemplateOnly: There is no generic template, use the <srtemplate> to create a reasonable spoken result.

None: The result could/should stand on its own without a preamble, mostly for one-off questions and answers (generally signalled by input type "Miscellaneous" and result type "String"). E.g., "does this dress make me look fat?", answer: "Of course not, dear".

- resulttype

What type of object is the result?

Quantity: A number with unit (could be mixed radix like "5 feet 6 inches") Math: A general math expression

Number: A number (integer, real, rational)

String: A raw string of unspecified type, often just a phrase

Date: A date

Image: An image (the actual image not part of the spoken result)

<Entity>: An entity like Country, City, Chemical, etc. See below for more examples

- inputtype

Characterizes the interpretation of the input. There are a wide variety of these, some examples:

SimpleMath: Simple math arithmetic with numbers < 1000

Math: Other math input

ConvertUnits: Unit conversion

Formula: Formula/calculator input

Miscellaneous: Represents various ad hoc questions not otherwise categorized

<Entity>Data: E.g., CountryData represents questions about countries, such as "population of Norway".

- sampletext

This gives a sample complete text for the spoken result, as constructed from the other pieces.

- <result> attributes and qualifiers

- value

The value attribute gives the text version of the core result

- <qualifier type='...'> element

A result can have one or more qualifiers whose type can be:

Rounded: A value (typically a quantity with units) have been rounded to a few digits for presentation purposes. Approximated: A number have been approximated to a handful of digits for presentation purposes

Annotated: There is suppressed annotation associated with the result (such as assumptions, footnotes, or parenthetical remarks)

A qualifier of Rounded/Approximated typically makes it natural to preface the core result by "about" or "approximately", while an Annotated qualifier makes it natural to preface the result by something like "It looks like...".

- <srtemplate> attributes

- name

The name attributes indicates which template it is. Current templates include "PropertyEntity", "PropertyEntityDate", "WordDefinitions", and "ConvertUnits". See next section for more details on each template.

- sampletext

This gives a sample complete text for the given template, as constructed from the other pieces.

- <srvariable> attributes

The <srtemplate> element typically includes several <srvariable> elements specifying the components of the spoken result.

- name

This gives the name of the variable.

- value

A variable will typically have a value attribute representing the core value of the variable.

- pronunciation

A pronunciation attribute, if given, indicates how to pronounce the core value.

- article, preposition, verb

A variable may contain grammatical elements that are needed to construct a good sentence. These usually have default values for a given template which can be overridden in any given case.

- type

If specifies indicate what type of object the variable refers to. E.g., what type of entity in an "Entity" variable.

- inherit

This is currently only used for a "Result" variable, if inherit='true' is set, it means that the "Result" value and qualifiers can be inferred from the top level <result> element inside <spokenresult>.

- <srvariablelist> attributes

<srvariablelist> represents a list of variables where the spoken result will often just use the first or first few items.

- name

A name to identify the type of list

- count

This gives the total number of items that belong in a full version of the list (typically not all items are included inside)

- <srvariablelistitem> attributes

This represents an item inside a <srvariablelist> element, it has similar attributes to <srvariable> such as value, type, etc.

- Partial list of WolframlAlpha entity types Below is a partial list of the entity types that can occur in resulttype as well as in inputtype {AcademyAward, Acronym, ACT, AdministrativeDivision, Aircraft, Airline, Airport, AlgebraicCode, Alloy, ApolloMission, AreaCode, Astronomical, AstronomicalObservatory, AtomicSpectrum, Automobile, Award, BankRate, Battery, BeaufortScale, Biomolecule, BirthMonth, Book, Bridge, BroadcastStation, Building, Castle, CatBreed, Character, Chemical, ChemicalIntermediate, ChemicalReactionEntity, City, ClothingSize, Cloud, Color, Commodity, CommonMaterial, Company, ComputerKeyboard, CongressionalDistrict, Constellation, ConsumerProductsPTE, Country, CrystalFamily, CrystalSystem, CurrencyDenomination, Dam, DataTransferDevice, Death, DeepSpaceProbe, Desert, DietaryReference, DimensionalLumber, Dinosaur, Disease, DisplayFormat, DistrictCourt, DogBreed, DomainName, DrillBit, DrillGauge, DrugBrandName, DrugChemical, DrugIngredient, DrugIngredientCollection, EarthImpact, Economic, Element, Enzyme, Epidemic, ESDMAOccupation, EthnicGroup, ExternalObject, FacebookPage, FacebookUser, FamousText, FaultLineData, FictionalCharacter, FileFormat, Financial, FiniteGroup, FlightNumber, Food, Foundation, FreightContainer, FrequencyAllocation, GasPrice, Gene, Genome, GenomeSequence, Geodesy, Geometry, GeoProjection, GivenName, Glacier, GlobalClimateData, Graph, HardwoodDimensionalLumber, Highway, HistoricalCountry, HistoricalEvent, HistoricalPeriod, Holiday, HornbostelSachsNumber, Hospital, Hurricane, ICDNine, InfectiousDisease, InternationalTransportation, Internet, InternetPort, Island, Isotope, Knot, Lake, Lamina, Language, Laser, Lattice, Leader, LegalTerm, Library, Material, Mathematica, MathematicalFunctionIdentity, MathWorld, MatrixEntity, MedicalTest, MetabolicPathway, MetropolitanArea, MilitaryBase, Mine, Mineral, Miscellaneous, MLBGame, MLBPlayer, MLBTeam, MobileCarrier, Mortality, Mountain, Movie, MovieTheater, Music, MusicAct, MusicActPerformer, MusicAlbum, MusicAlbumRelease, MusicalInstrument, MusicalKey, MusicArtistCredit, MusicMovement, MusicWork, MusicWorkRecording, Mythology, Nail, NamedTimeZone, NBAGame, NBAPlayer, NBATeam, NFLGame, NFLPlayer, NFLTeam, NOAAAlert, NotableComputer, NuclearExplosion, NuclearReactor, NuclearReactorSite, NuclearTestSite, Occupation, Ocean, OilRig, OlympicMedalist, Paclet, Paper, PaperWeight, Park, Particle, ParticleAccelerator, ParticleInteraction, Periodical, Person, PhysicalActivity, PhysicalSystems, PlaneCurve, Plant, Polyhedron, ProBaseball, Protein, ProteinStructure, QuantityData, RecurringEvent, Religion, Relocation, RetailLocation, River, Rope, SAT, Satellite, Ship, Shipyard, SNP, SolarInteriorLayer, SolarSystemFeature, Solid, SpaceCurve, SpaceWeather, Species, SportObject, Stadium, SteelGauge, StormType, Street, Surface, Surname, Symptom, Telephone, Telescope, TelevisionNetwork, TelevisionProgram, Thermodynamic, Tooth, Tourism, TrailerHitch, Translation, TreeGrowth, TropicalStorm, Tunnel, UnderseaFeature, University, UrbanArea, USCounty, USFairMarketRent, USIncomeTax, USPrivateSchool, USPublicSchool, USSchoolDistrict, USState, USTax, USVisa, VideoGame, VideoGameRelease, Volcano, Waterfall, WeatherStation, WeddingAnniversary, WireGauge, Wood, Word, WrenchSize, WritingSystem, ZIPCode}

Custom <srtemplate> templates reference

In the section follows a description of the current custom templates.

- PropertyEntity

This template describes many common property+entity questions, such as "what is the height of Mount Everest?" or "what is the melting point of iron?".

*Appendix*

- Template composition

The following describes a possible way to create a spoken result from the elements of the template, it also gives the default value of certain elements:

"<Property:article:> <Property:value> <Property:preposition:of> <Entity:article:> <Entity:value> <Property:verb:is> <Result>"

E.g., <Property:preposition:of> refers to the "prepostion" attribute of the <srvariable> with name "Property". If that attribute is not present, then the default value "of" should be used.

- Template variables and some of their fields

- Property value: name that refers to property article: definite article, typically "the", to use if need be preposition: normal preposition used between property and entity, default "of" verb: the verb normally used between property+entity and the value, default "is"

- Entity value: name referring to the entity article: if entity normally requires a "the" article, it's given here type: the type of entity, such as "Country" or "City"

pronunciation: string representing the pronunciation of the entity

- Result inherit: usually set to True, meaning the result should be gotten from the <result> field under <spokenresult> value: the actual result value if not inherited pronunciation: string representing the pronunciation of the result

- PropertyEntityDate

This template is similar to PropertyEntity, but also allows for a date associated with the question, such as "what was the population of Norway in 1985?".

- Template composition

"<Property:article:> <Property:value> <Property:preposition:of> <Entity:article:> <Entity:value> <Date:preposition:in> <Date:value> <Property:verb:was> <Result>"

- Template variables and some of their fields
  - Property

Same as for PropertyEntity, except the default verb is "was"

- Entity

Same as for PropertyEntity

- Result

Same as for PropertyEntity

- Date value: the value of the date, currently just a year (will be generalized later)

- ConvertUnits

This template is used for unit conversions such as "what is 5 feet in meters?" or "how many cups in a gallon?"

- Template composition

"<InputQuantity:value> converts to <Result>"

- Template variables and fields

- InputQuantity value: the string representing the quantity to be converted

- Result

This is always inherited from the main result and represents the converted quantity

- WordDefinitions

This template is used to represent word definitions, such as "defme pusillanimous".

- Template composition

This is a more complex template, not fitting directly into the simple template compositions given earlier

- Template variables and fields

- Word value: the word (or phrase) to be defined

- WordDefinition (srvariablelist)

count: the total number of word definitions known to WolframlAlpha for this word The list then consist of the first few word definitions given in srvariablelistitem elements:

- srvariablelistitem value: the defmition of the word type: gives the part of speech associated with the word definition (noun, verb, adjective, etc)

Annotated \<srtemplate\> examples

Here's a basic PropertyEntity template, making use of an entity article as is required for "the Earth":

Question: what is the circumference of the earth?

Answer: *The equatorial circumference of the Earth is about 24900 miles*

```
<spokenresult generictemplate='TheResultIs' resulttype='Quantity' inputtype='AstronomicalData' sampletext='The answer is about 24900 miles'>
  <result value='24900 miles'>
    <qualifier type='Rounded' />
  </result>
  <srtemplate name='PropertyEntity' sampletext='The equatorial circumference of the Earth is about 24900 miles'>
    <srvariable name='Property' value='equatorial circumference' article='the' />
    <srvariable name='Entity' value='Earth' type='Astronomical' article='the' />
    <srvariable name='Result' inherit='true' />
  </srtemplate>
</spokenresult>
```

The following example shows a case of a pronunciation attribute in the result:

Question: what's the chemical symbol of Plutonium?

Answer: *The chemical symbol for plutonium is Pu*

```
<spokenresult generictemplate='TheResultIs' resulttype='String' inputtype='ElementData' sampletext='The answer is Pu'>
```

```
  <result value='Pu' />

<srtemplate name='PropertyEntity' sampletext='The chemical symbol for plutonium is Pu'>

<srvariable name='Property' value='chemical symbol' preposition='for' article='the' />

<srvariable name='Entity' value='plutonium' type='Element' />

<srvariable name='Result' value='Pu' pronunciation='p u' />

</srtemplate>

</spokenresult>
```

Question: what's the capital of norway

Answer: *The capital city of Norway is Oslo*

```
<spokenresult generictemplate='TheResultIs' resulttype='City' inputtype='Country Data' sampletext='The answer is Oslo'>

<result value='Oslo' />

<srtemplate name='PropertyEntity' sampletext='The capital city of Norway is Oslo'>

<srvariable name='Property' value='capital city' article='the' />

<srvariable name='Entity' value='Norway' type='Country' />

<srvariable name='Result' inherit='true' />

</srtemplate>

</spokenresult>
```

A sample WordDefinitions template where there is only one available definition:

Question: define pusillanimous

Answer: *The definition of 'Pusillanimous" is: lacking in courage and manly strength and resolution; contemptibly fearful*

```
<spokenresult generictemplate='SRTemplateOnly' resulttype='WordDefinitions'
inputtype='WordData'>
  <result value='1 word definition' />
    <srtemplate name='WordDefinitions' sampletext='The definition of
"pusillanimous" is: lacking in courage and manly strength and
resolution; contemptibly fearful'>
    <srvariable name='Word' value='pusillanimous' />
    <srvariablelist name='WordDefinition' count='1'>
      <srvariablelistitem value='lacking in courage and manly strength and
resolution; contemptibly fearful' type='adjective' />
    </srvariablelist>
  </srtemplate>
</spokenresult>
```

A WordDefinitions template where there is a total of 17 definitions:

Question: define walk

Answer: *From 17 definitions of "walk", the first one is: the act of traveling by foot*

```
<spokenresult generictemplate='SRTemplateOnly' resulttype='WordDefinitions'
inputtype='WordData'>
  <result value='17 word definitions'>
    <qualifier type='Annotated' />
  </result>
    <srtemplate name='WordDefinitions' sampletext='From 17 definitions of
"walk", the first one is: the act of traveling by foot'>
    <srvariable name='Word' value='walk' />
```

```
<srvariablelist name='WordDefinition' count='17'>
  <srvariablelistitem value='the act of traveling by foot' type='noun' />
<srvariablelistitem value='(baseball) an advance to first base by a batter who receives four balls' type='noun' />
  <srvariablelistitem value='manner of walking' type='noun' />
</srvariablelist>

</srtemplate>

</spokenresult>
```

A basic ConvertUnits template, showing the use of a "Rounded" qualifier in the result:

Question: convert 10 miles to kilometers

Answer: *10 miles converts to about 16.1 kilometers*

```
<spokenresult generictemplate='TheResultIs' resulttype='Quantity' inputtype='ConvertUnits' sampletext='The answer is about 16.1 kilometers'>

<result value='16.1 kilometers'>

<qualifier type='Rounded' />

</result>

<srtemplate name='ConvertUnits' sampletext='10 miles converts to about 16.1 kilometers'>

<srvariable name='InputQuantity' value='10 miles' />

</srtemplate>

</spokenresult>
```

Question: how many cups in a gallon?

Answer: *1 gallon converts to 16 cups*

```
<spokenresult generictemplate='TheResultIs' resulttype='Quantity' inputtype='Con
``` vertUnits' sampletext='The answer is 16 cups'>

<result value='16 cups' />

<srtemplate name='ConvertUnits' sampletext='1 gallon converts to 16 cups'>
<srvariable name='InputQuantity' value='1 gallon' />

</srtemplate>

</spokenresult>

Some population queries showing both present, past and future references. Currently asking for present population does not include a date (even though the data might be for a year different than the current year) - this may change.

Question: what's the population of Sri Lanka?

Answer: *It looks like the population of Sri Lanka is about 20.4 million people*

<spokenresult generictemplate='TheResultIs' resulttype='Quantity' inputtype=''. CountryData' sampletext='It looks like the answer is about 20.4 million people'> <result value='20.4 million people'>

<qualifier type='Annotated' />

<qualifier type='Rounded' />

</result>

<srtemplate name='PropertyEntity' sampletext='It looks like the population of Sri Lanka is about 20.4 million people'>

<srvariable name='Property' value='population' article='the' />

<srvariable name='Entity' value='Sri Lanka' type='Country' />

<srvariable name='Result' inherit='true' />

</srtemplate>

</spokenresult>

Question: population of the seychelles in 1995

Answer: *It looks like the population of the Seychelles in 1995 was about 75700 people*

<spokenresult generictemplate='TheResultIs' resulttype='Quantity' inputtype=''. CountryData' sampletext='It looks like the answer is about 75700 people'>

<result value='75700 people'>

<qualifier type='Annotated' />

<qualifier type='Rounded' />

</result>

<srtemplate name='PropertyEntityDate' sampletext='It looks like the population of the Seychelles in 1995 was about 75700 people'>

<srvariable name='Property' value='population' article='the' />

<srvariable name='Entity' value='Seychelles' type='Country' article='the' /> <srvariable name='Date' value='1995' />

<srvariable name='Result' inherit='true' />

</srtemplate>

</spokenresult>

Question: population of india in 2030

Answer: *It looks like the population of India in 2030 will be about 1.48 billion people*

<spokenresult generictemplate='TheResultIs' resulttype='Quantity' inputtype= 'CountryData' sampletext='It looks like the answer is about 1.48 billion people'> <result value='1.48 billion people'>

<qualifier type='Annotated' />

<qualifier type='Rounded' />

</result>

```
<srtemplate name='PropertyEntityDate' sampletext='It looks like the population of India in 2030 will be about 1.48 billion people'>

<srvariable name='Property' value='population' article='the' verb='will be' /> <srvariable name='Entity' value='India' type='Country' />

<srvariable name='Date' value='2030' />

<srvariable name='Result' inherit='true' />

</srtemplate>

</spokenresult>
```

Other examples

Here is a list of further examples. Many of these do not yet have an <srtemplate> custom template.

Question: How many feet are in a mile Answer: *1 mile converts to about 5280 feet*

```
<spokenresult generictemplate='TheResultIs' resulttype='Quantity' inputtype='ConvertUnits' sampletext='The answer is about 5280 feet'>

<result value='5280 feet'> <qualifier type='Rounded' />
  </result>

<srtemplate name='ConvertUnits' sampletext='1 mile converts to about 5280 feet'>

<srvariable name='InputQuantity' value='1 mile' />

</srtemplate>
```

</spokenresult>

Question: How high is mount Everest

Answer: *The height of Mount Everest is about 29000 feet*

<spokenresult generictemplate='TheResultIs' resulttype='Quantity' inputtype='MountainData' sampletext='The answer is about 29000 feet'>

<result value='29000 feet'>

<qualifier type='Rounded' />

</result>

<srtemplate name='PropertyEntity' sampletext='The height of Mount Everest is about 29000 feet'>

<srvariable name='Property' value='height' article='the' />

<srvariable name='Entity' value='Mount Everest' type='Mountain' />

<srvariable name='Result' inherit='true' />

</srtemplate>

</spokenresult>

Question: How many cups are in a gallon

Answer: *1 gallon converts to 16 cups*

<spokenresult generictemplate='TheResultIs' resulttype='Quantity' inputtype='ConvertUnits' sampletext='The answer is 16 cups'>

<result value='16 cups' />

<srtemplate name='ConvertUnits' sampletext='1 gallon converts to 16 cups'>

<srvariable name='InputQuantity' value='1 gallon' />

</srtemplate>

</spokenresult>

Question: How many days to Christmas

Answer: *The answer is 47 days*

<spokenresult generictemplate='TheResultIs' resulttype='Quantity' sampletext='The answer is 47 days'>

<result value='47 days' />

</spokenresult>

Question: How fast can a cheetah run

Answer: *The answer is about 75 miles per hour*

<spokenresult generictemplate='TheResultIs' resulttype='Quantity' inputtype='Miscellaneous' sampletext='The answer is about 75 miles per hour'>

<result value='75 miles per hour'>

<qualifier type='Rounded' />

</result>

</spokenresult>

Question: What's the square root of 144

Answer: *The answer is 12*

<spokenresult generictemplate='TheResultIs' resulttype='Number' inputtype='Math' sampletext='The answer is 12'>

<result value='12' />

</spokenresult>

Question: How many days are in a year

Answer: *1 year converts to 365 days*

```
<spokenresult generictemplate='TheResultIs' resulttype='Quantity' inputtype=
'ConvertUnits' sampletext='The answer is 365 days'>
 <result value='365 days' />
 <srtemplate name='ConvertUnits' sampletext='1 year converts to 365 days'>
  <srvariable name='InputQuantity' value='1 year' />
 </srtemplate>
```

</spokenresult>

Question: What is the tallest mountain in the world

Answer: *It looks like the answer is Mount Everest*

```
<spokenresult generictemplate='TheResultIs' resulttype='Mountain'
sampletext='It looks like the answer is Mount Everest'>
 <result value='Mount Everest'>
  <qualifier type='Annotated' />
 </result>
```

</spokenresult>

Question: How many teaspoons in a tablespoon Answer: *1 tablespoon converts to 3 teaspoons*

```
<spokenresult generictemplate='TheResultIs' resulttype='Quantity' inputtype='Con
vertUnits' sampletext='The answer is 3 teaspoons'>
 <result value='3 teaspoons' />
 <srtemplate name='ConvertUnits' sampletext='1 tablespoon converts to 3 teaspoons'>
  <srvariable name='InputQuantity' value='1 tablespoon' />
```

</srtemplate>

</spokenresult>

Question: Does this dress make me look fat

Answer: *Of course not, dear.*

<spokenresult generictemplate='None' resulttype='String' inputtype='Miscellaneous' sampletext='Of course not, dear.'>

<result value='Of course not, dear.' />

</spokenresult>

Question: How many grams are in a pound

Answer: *1 pound converts to about 454 grams*

<spokenresult generictemplate='TheResultIs' resulttype='Quantity' inputtype='ConvertUnits' sampletext='The answer is about 454 grams'>

<result value='454 grams'>

<qualifier type='Rounded' />

</result>

<srtemplate name='ConvertUnits' sampletext='1 pound converts to about 454 grams'>

<srvariable name='InputQuantity' value='1 pound' />

</srtemplate>

</spokenresult>

Question: What is the square root of 81

Answer: *The answer is 9*

<spokenresult generictemplate='TheResultIs' resulttype='Number' inputtype='Math' sampletext='The answer is 9'>

```
<result value='9' />
```

</spokenresult>

Question: How many seconds are in a year

Answer: *1 year converts to about 31.5 million seconds*

<spokenresult generictemplate='TheResultIs' resulttype='Quantity' inputtype='ConvertUnits' sampletext='The answer is about 31.5 million seconds'>

<result value='31.5 million seconds'>

<qualifier type='Rounded' />

</result>

<srtemplate name='ConvertUnits' sampletext='1 year converts to about 31.5 million seconds'>

<srvariable name='InputQuantity' value='1 year' />

</srtemplate>

</spokenresult>

Question: What's the square root of 32

Answer: *The answer is approximately 5.65685*

<spokenresult generictemplate='TheResultIs' resulttype='Number' inputtype='Math' sampletext='The answer is approximately 5.65685'>

<result value='5.65685'>

<qualifier type='Approximated' />

</result>

</spokenresult>

Question: 5x3

Answer: *The answer is 15*

\<spokenresult generictemplate='TheResultIs' resulttype='Number' inputtype='SimpleMath' sampletext='The answer is 15'>

\<result value='15' />

\</spokenresult>

Question: What is the capital of the USA

Answer: *The capital city of the United States is Washington, District of Columbia*

\<spokenresult generictemplate='TheResultIs' resulttype='City' inputtype='Country Data' sampletext='The answer is Washington, District of Columbia'>

\<result value='Washington, District of Columbia' />

\<srtemplate name='PropertyEntity' sampletext='The capital city of the United States is Washington, District of Columbia'>

\<srvariable name='Property' value='capital city' article='the' />

\<srvariable name='Entity' value='United States' type='Country' article='the'/>

\<srvariable name='Result' inherit='true' />

\</srtemplate>

\</spokenresult>

Question: How many yards are in a mile

Answer: *1 mile converts to about 1760 yards*

\<spokenresult generictemplate='TheResultIs' resulttype='Quantity' inputtype='ConvertUnits' sampletext='The answer is about 1760 yards'>

\<result value='1760 yards'>

\<qualifier type='Rounded' />

</result>

<srtemplate name='ConvertUnits' sampletext='1 mile converts to about 1760 yards'>

<srvariable name='InputQuantity' value='1 mile' />

</srtemplate>

</spokenresult>

Question: How many pints are in a quart

Answer: *1 quart converts to 2 pints*

<spokenresult generictemplate='TheResultIs' resulttype='Quantity' inputtype='ConvertUnits' sampletext='The answer is 2 pints'><result value='2 pints' />

<srtemplate name='ConvertUnits' sampletext='1 quart converts to 2 pints'>
    <srvariable name='InputQuantity' value='1 quart' />
  </srtemplate>

</spokenresult>

Question: capital of Massachusetts

Answer: *The capital of Massachusetts is Boston*

<spokenresult generictemplate='TheResultIs' resulttype='City' inputtype='USState Data' sampletext='The answer is Boston'>

<result value='Boston' />

<srtemplate name='PropertyEntity' sampletext='The capital of Massachusetts is Boston'>

<srvariable name='Property' value='capital' article='the' />

<srvariable name='Entity' value='Massachusetts' type='USState' />

<srvariable name='Result' inherit='true' />

\</srtemplate\>

\</spokenresult\>

Question: How far is mars

Answer: *The distance from the Earth to Mars is about 2.08 astronomical units*

\<spokenresult generictemplate='TheResultIs' resulttype='Quantity' inputtype='As% tronomicalData' sampletext='The answer is about 2.08 astronomical units'\> \<result value='2.08 astronomical units'\>

\<qualifier type='Rounded' /\>

\</result\>

\<srtemplate name='PropertyEntity' sampletext='The distance from the Earth to Mars is about 2.08 astronomical units'\>

\<srvariable name='Property' value='distance from the Earth' preposition='to' article='the' /\>

\<srvariable name='Entity' value='Mars' type='Astronomical' /\>

\<srvariable name='Result' inherit='true' /\>

\</srtemplate\>

\</spokenresult\>

Question: How many feet in a meter Answer: *1 meter converts to about 3.28 feet*

\<spokenresult generictemplate='TheResultIs' resulttype='Quantity' inputtype='Con vertUnits' sampletext='The answer is about 3.28 feet'\>

\<result value='3.28 feet'\>
  \<qualifier type='Rounded' /\>
  \</result\>

```
      <srtemplate name='ConvertUnits' sampletext='1 meter converts to about 3.28 feet'>
        <srvariable name='InputQuantity' value='1 meter' />
      </srtemplate>
</spokenresult>
```

Question: How old is Eli Manning

Answer: *The answer is 31 years 10 months 5 days*

```
<spokenresult generictemplate='TheResultIs' resulttype='Quantity'
sampletext='The answer is 31 years 10 months 5 days'>
    <result value='31 years 10 months 5 days' />
</spokenresult>
```

Question: population of Germany

Answer: *It looks like the population of Germany is about 82.1 million people*

```
<spokenresult generictemplate='TheResultIs' resulttype='Quantity' inputtype=
'CountryData' sampletext='It looks like the answer is about 82.1 million people'> <result
value='82.1 million people'>
<qualifier type='Annotated' />
<qualifier type='Rounded' />
</result>
    <srtemplate name='PropertyEntity' sampletext='It looks like the population of Germany
is about 82.1 million people'>
<srvariable name='Property' value='population' article='the' />
<srvariable name='Entity' value='Germany' type='Country' l>
<srvariable name='Result' inherit='true' />
</srtemplate>
```

</spokenresult>

Question: What is Lady Gaga's real name

Answer: *The answer is Stefani Joanne Angelina Germanotta*

<spokenresult generictemplate='TheResultIs' resulttype='String' inputtype='PeopleData' sampletext='The answer is Stefani Joanne Angelina Germanotta'>

<result value='Stefani Joanne Angelina Germanotta' />

</spokenresult>

Question: Ben Roethlisberger pass completion % in 2004

Answer: *The answer is about 66.4 percent*

<spokenresult generictemplate='TheResultIs' resulttype='Quantity' inputtype='NFLPlayerData' sampletext='The answer is about 66.4 percent'>

<result value='66.4 percent'>
<qualifier type='Rounded' />
</result>

</spokenresult>

Question: fifth root of 59049

Answer: *The answer is 9*

<spokenresult generictemplate='TheResultIs' resulttype='Number' inputtype='Math' sampletext='The answer is 9'>

<result value='9' />

</spokenresult>

Question: **width Victoria Falls /
Iguacu Falls** Answer: *It looks like the answer is about 0.643*

```xml
<spokenresult generictemplate='TheResultIs' resulttype='Quantity'
sampletext='It looks like the answer is about 0.643'>
<result value='0.643'>
 <qualifier type='Annotated' />
<qualifier type='Rounded' />
</result>
</spokenresult>
```

Question: how many judges are there in Iffinois Northern District Court

Answer: *It looks like the answer is 22*

```xml
<spokenresult generictemplate='TheResultIs' resulttype='Quantity' inputtype='DistrictCourtData' sampletext='It looks like the answer is 22'>
<result value='22'>
  <qualifier type='Annotated' />
 </result>
</spokenresult>
```

Question: price of milk in Indianapolis

Answer: *It looks like the answer is about 2.09 US dollars*

```xml
<spokenresult generictemplate='TheResultIs' resulttype='Quantity' inputtype='RelocationData' sampletext='It looks like the answer is about 2.09 US dollars'> <result value='2.09 US dollars'>
  <qualifier type='Annotated' />
  <qualifier type='Rounded' />
 </result>
</spokenresult>
```

Question: next rise of the Great Red Spot

Answer: *The answer is 3:12 am EST; Friday, November 9, 2012*

<spokenresult generictemplate='TheResultIs' resulttype='Date' inputtype='AstronomicalData' sampletext='The answer is 3:12 am EST; Friday, November 9, 2012'> <result value='3:12 am EST; Friday, November 9, 2012' />

</spokenresult>

Question: sqrt 1801

Answer: *It looks like the answer is approximately 42.4382*

<spokenresult generictemplate='TheResultIs' resulttype='Number' inputtype='Math' sampletext='It looks like the answer is approximately 42.4382'>

<result value='42.4382'>

<qualifier type='Annotated' />

<qualifier type='Approximated' />

</result>

</spokenresult>

Question: local maximum x^5 - 10x^3 + 30x

Answer: *The answer is approximately 21.3138 at x = 1.12603 and -11.0328 at x = -2.17533*

<spokenresult generictemplate='TheResultIs' resulttype='MathFeature' sampletext='The answer is approximately 21.3138 at x = 1.12603 and -11.0328 at x = -2.17533'>

<result value='21.3138 at x = 1.12603 and -11.0328 at x = -2.17533'>

<qualifier type='Approximated' />

</result>

</spokenresult>

Question: people killed in car crashes in the UK in 2003

Answer: *It looks like the answer is about 3500 deaths per year*

<spokenresult generictemplate='TheResultIs' resulttype='Quantity' inputtype='InternationalTransportationData' sampletext='It looks like the answer is about 3500 deaths per year'>

<result value='3500 deaths per year'>

<qualifier type='Annotated' />

<qualifier type='Rounded' />

</result>

</spokenresult>

Question: elevation Denver - Los Angeles Answer: *The answer is about 4990 feet*

<spokenresult generictemplate='TheResultIs' resulttype='Quantity' sampletext='The answer is about 4990 feet'>

<result value='4990 feet'>

<qualifier type='Rounded' />

</result>

</spokenresult>

Question: orbital period of Quaoar

Answer: *The answer is about 288 .Tulian years*

<spokenresult generictemplate='TheResultIs' resulttype='Quantity' inputtype='AstronomicalData' sampletext='The answer is about 288 Julian years'>

```
<result value='288 Julian years'>

<qualifier type='Rounded' />

</result>

</spokenresult>
```

Question: zodiac sign for 3/17/2030

Answer: *The answer is Pisces*

```
<spokenresult generictemplate='TheResultIs' resulttype='String' sampletext='The answer is Pisces'>

<result value='Pisces' />

</spokenresult>
```

Question: oak woods modulus of rupture

Answer: *It looks like the answer is about 11600 pounds-force per square inch*

```
<spokenresult generictemplate='TheResultIs' resulttype='Quantity' inputtype='%WoodData' sampletext='It looks like the answer is about 11600 pounds‐force per square inch'>

<result value='11600 pounds‐force per square inch'>

<qualifier type='Annotated' />

<qualifier type='Rounded' />

</result>

</spokenresult>
```

Question: population Brussels / Paris

Answer: *It looks like the answer is about 0.499*

```
<spokenresult generictemplate='TheResultIs' resulttype='Quantity' sampletext='It looks like the answer is about 0.499'>
```

```
<result value='0.499'>
 <qualifier type='Annotated' />
<qualifier type='Rounded' />
</result>
</spokenresult>
```

Question: empty weight of a main deck pallet

Answer: *The answer is 904 pounds*

```
<spokenresult generictemplate='TheResultIs' resulttype='Quantity'
inputtype='FreightContainerData' sampletext='The answer is 904 pounds'>
<result value='904 pounds' />
</spokenresult>
```

Question: When was Dune published? Answer: *The answer is December 1965*

```
<spokenresult generictemplate='TheResultIs' resulttype='Date' inputtype=
'BookData' sampletext='The answer is December 1965'>
<result value='December 1965' /> </spokenresult>
```

Question: intercity bus driver salary

Answer: *It looks like the answer is about 34180 US dollars per year*

```
<spokenresult generictemplate='TheResultIs' resulttype='Quantity' inputtype=
'OccupationData' sampletext='It looks like the answer is about 34180 US dollars per year'>
 <result value='34180 US dollars per year'>
  <qualifier type='Annotated' />
```

```
    <qualifier type='Rounded' />
  </result>
</spokenresult>
```

Question: .1234 with the last 2 digits repeating

Answer: *It looks like the answer is 611/4950*

```
<spokenresult generictemplate='TheResultIs' resulttype='Number' sampletext='It looks like the answer is 611/4950'>
  <result value='611/4950'>
    <qualifier type='Annotated' />
  </result>
</spokenresult>
```

Question: length of US1

Answer: *The answer is 2377 miles*

```
<spokenresult generictemplate='TheResultIs' resulttype='Quantity' inputtype='HighwayData' sampletext='The answer is 2377 miles'>
  <result value='2377 miles' />
</spokenresult>
```

Question: Mary Shelley's place of birth

Answer: *The answer is London, Greater London, United Kingdom*

```
<spokenresult generictemplate='TheResultIs' resulttype='City' inputtype='PeopleData' sampletext='The answer is London, Greater London, United Kingdom'>
  <result value='London, Greater London, United Kingdom' />
</spokenresult>
```

Question: five sixteenths

Answer: *It looks like the answer is approximately 0.3125*

<spokenresult generictemplate='TheResultIs' resulttype='Number' inputtype='SimpleMath' sampletext='It looks like the answer is approximately 0.3125'>

<result value='0.3125'>

<qualifier type='Annotated' />

<qualifier type='Approximated' />

</result>

</spokenresult>

Question: what fraction of the population is Cuban Hispanic in Miami

Answer: *It looks like the answer is about 34.5 percent*

<spokenresult generictemplate='TheResultIs' resulttype='Quantity' inputtype='ACS Data' sampletext='It looks like the answer is about 34.5 percent'>

<result value='34.5 percent'>
  <qualifier type='Annotated' />
  <qualifier type='Rounded' />
  </result>

</spokenresult>

Question: unemployment rate Detroit

Answer: *It looks like the answer is about 18.1 percent*

<spokenresult generictemplate='TheResultIs' resulttype='Quantity' inputtype='CityData' sampletext='It looks like the answer is about 18.1 percent'>

<result value='18.1 percent'> <qualifier type='Annotated' />
      <qualifier type='Rounded'

/> </result>

</spokenresult>

What is claimed is:

1. A method for providing information, the method comprising:
receiving, at one or more processors, a natural language query;
determining, at one or more processors, an answer to the natural language query;
formatting, at one or more processors, one or more electronic messages that include:
the answer, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the query was interpreted in determining the answer and (ii) not included in the query; and
transmitting the one or more electronic messages via a communication network.

2. The method of claim 1, wherein the metadata includes information to enable construction by the computing device, using the metadata, of the sentence or statement so that the sentence or statement further rephrases the query.

3. The method of claim 1, wherein:
the answer comprises an electronic object; and
the metadata includes information to enable construction by the computing device, using the metadata, of the sentence or statement so that the sentence or statement describes the electronic object and/or contents of the electronic object.

4. The method of claim 3, wherein:
the electronic object comprises a picture; and
the metadata includes descriptive information regarding content of the picture to enable construction by the computing device, using the metadata, of the sentence or statement so that the sentence or statement describes content of the picture.

5. The method of claim 3, wherein:
the electronic object comprises a list; and
the metadata includes descriptive information regarding content of the list to enable construction by the computing device, using the metadata, of the sentence or statement so that the sentence or statement describes content of the list.

6. The method of claim 5, wherein the metadata further includes an indication of a subset of items in the list to include in the sentence or statement.

7. The method of claim 3, wherein:
the electronic object comprises a plot; and
the metadata includes descriptive information regarding the plot to enable construction by the computing device, using the metadata, of the sentence or statement so that the sentence or statement describes what the plot visually depicts.

8. A tangible, non-transitory computer readable storage medium or media having stored thereon machine executable instructions that, when executed by one or more processors, cause the one or more processors to:
receive a natural language query;
determine an answer to the natural language query;
format one or more electronic messages that include:
the answer, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the natural language query was interpreted in determining the answer and (ii) not included in the query; and
cause a network interface device to transmit the one or more electronic messages via a communication network.

9. The computer readable storage medium or media of claim 8, wherein the metadata includes information to enable construction by the computing device, using the metadata, of the sentence or statement so that the sentence or statement further rephrases the query.

10. The computer readable storage medium or media of claim 8, wherein:
the answer comprises an electronic object; and
the metadata includes information to enable construction by the computing device, using the metadata, of the sentence or statement so that the sentence or statement describes the electronic object and/or contents of the electronic object.

11. The computer readable storage medium or media of claim 10, wherein
the electronic object comprises a picture; and
the metadata includes descriptive information regarding content of the picture to enable construction by the computing device, using the metadata, of the sentence or statement so that the sentence or statement describes content of the picture.

12. A system for providing information, comprising:
a network interface device to communicatively couple to a communication network;
one or more processors configured to:
receive a natural language query;
determine an answer to the natural language query;
format one or more electronic messages that include:
the answer, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the natural language query was interpreted in determining the answer and (ii) not included in the query; and
cause the network interface device to transmit the one or more electronic messages via the communication network.

13. The system of claim 12, wherein the metadata includes information to enable construction by the computing device, using the metadata, of the sentence or statement so that the sentence or statement further rephrases the query.

14. The system of claim 12, wherein:
the answer comprises an electronic object; and
the metadata includes information to enable construction by the computing device, using the metadata, of the sentence or statement so that the sentence or statement describes the electronic object and/or contents of the electronic object.

15. A method for providing information, the method comprising:
receiving, at one or more processors, a natural language query;

receiving, via a communication network, one or more first electronic messages that include
an answer to the natural language query, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the natural language query was interpreted in determining the answer and (ii) not included in the query; and
generating, at one or more processors, the syntactically correct natural language sentence or statement that recites and/or describes the answer using the metadata in the one or more first electronic messages.

16. The method of claim 15, further comprising:
transmitting, via the communication network, a second electronic message that includes the natural language query;
wherein the one or more first electronic messages are responsive to the second electronic message.

17. The method of claim 15, wherein:
the metadata includes information to enable construction by the computing device, using the metadata, of the natural language sentence or statement so that the natural language sentence or statement further rephrases the query.

18. The method of claim 15, wherein generating the natural language sentence or statement further uses the answer.

19. The method of claim 15, wherein:
the answer comprises an electronic object; and
the metadata includes information to enable construction by the computing device, using the metadata, of the sentence or statement so that the sentence or statement describes the electronic object and/or contents of the electronic object.

20. A tangible, non-transitory computer readable storage medium or media having stored thereon machine executable instructions that, when executed by one or more processors, cause the one or more processors to:
receive a natural language query; and
receive one or more first electronic messages that include
an answer to the natural language query, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the natural language query was interpreted in determining the answer and (ii) not included in the query; and
generate the syntactically correct natural language sentence or statement that recites and/or describes the answer using the metadata in the one or more first electronic messages.

21. The computer readable storage medium or media of claim 20, further storing machine executable instructions that, when executed by one or more processors, cause the one or more processors to:
cause a second electronic message that includes the natural language query to be transmitted via a communication network;
wherein the one or more first electronic messages are responsive to the second electronic message.

22. The computer readable storage medium or media of claim 20, wherein:
the metadata includes information to enable construction by the computing device, using the metadata, of the natural language sentence or statement so that the natural language sentence or statement further rephrases the query.

23. The computer readable storage medium or media of claim 20, further storing machine executable instructions that, when executed by one or more processors, cause the one or more processors to generate the natural language sentence or statement further using the answer.

24. The computer readable storage medium or media of claim 20, wherein:
the answer comprises an electronic object; and
the metadata includes information to enable construction by the computing device, using the metadata, of the sentence or statement so that the sentence or statement describes the electronic object and/or contents of the electronic object.

25. A system for providing information, comprising:
a network interface device to communicatively couple to a communication network;
one or more processors configured to:
receive a natural language query,
receive one or more first electronic messages that include
an answer to the natural language query, and
metadata corresponding to the answer, the metadata separate from the answer and including information to enable construction by a computing device, using the metadata, of a syntactically correct natural language sentence or statement that recites and/or describes the answer, wherein the information to enable construction comprises information (i) indicating how the natural language query was interpreted in determining the answer and (ii) not included in the query; and
generate the syntactically correct natural language sentence or statement that recites and/or describes the answer using the metadata in the one or more first electronic messages.

26. The system of claim 25, wherein:
the one or more processors are configured to cause the network interface device to transmit a second electronic message that includes the natural language query via the communication network;
wherein the one or more first electronic messages are responsive to the second electronic message.

27. The system of claim 25, wherein:
the one or more processors are configured to convert a first audio signal corresponding the natural language query to text; and
the one or more processors are configured to convert the natural language sentence or statement to a second audio signal.

28. The system of claim 25, wherein:
the metadata includes information to enable construction by the computing device, using the metadata, of the natural language sentence or statement so that the natural language sentence or statement further rephrases the query.

29. The system of claim 25, wherein the one or more processors are configured to generate the natural language sentence or statement further using the answer.

30. The system of claim 25, wherein:
the answer comprises an electronic object; and
the metadata includes information to enable construction by the computing device, using the metadata, of the sentence or statement so that the sentence or statement describes the electronic object and/or contents of the electronic object.

* * * * *